Patented Aug. 7, 1945

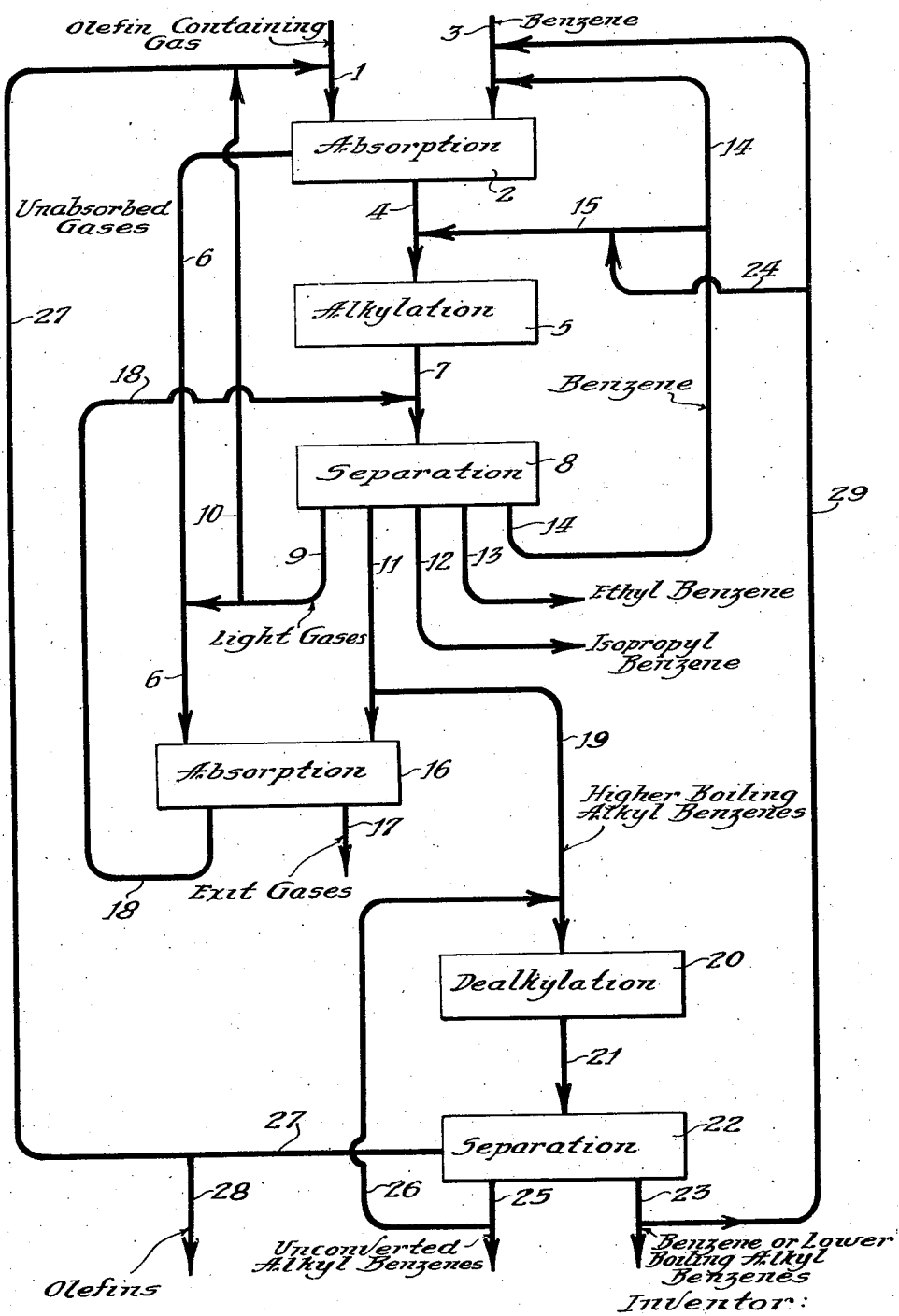

2,381,175

UNITED STATES PATENT OFFICE 2,381,175

PRODUCTION OF ALKYL AROMATIC HYDROCARBONS

William J. Mattox, Riverside, Ill., assignor to Universal Oil Products Company, Chicago, Ill., a corporation of Delaware Application February 22, 1943, Serial No. 476,663

11 Claims. (Cl. 260—671)

This invention is particularly concerned with the synthesis of alkyl benzenes such as ethyl, propyl, and butyl benzenes by the alkylation of benzene with olefins.

My invention is especially useful when it is desired to alkylate benzene or other aromatics with olefin-containing gas mixtures of varying compositions such as refinery gases from cracking or other hydrocarbon conversion operations. A novel feature of the process is the use of the aromatic reactant as a solvent for the olefins or the hydrocarbon fractions containing olefins.

In one specific embodiment my invention comprises the production of alkyl benzenes by contacting benzene in a first absorption step with olefin-containing gases to absorb olefins therefrom; passing effluent unabsorbed gases containing benzene to a second absorption step hereinafter described; supplying benzene containing dissolved olefins to an alkylation step wherein alkylation of benzene with olefins is effected; separating the alkylation reaction products into unreacted light gases, unconverted benzene, lower boiling alkyl benzenes and higher boiling alkyl benzenes; recovering said lower boiling alkyl benzenes; recycling said unconverted benzene to said first absorption step; supplying said unreacted light gases along with effluent gases from said first absorption step to said second absorption step; contacting said higher boiling alkyl benzenes in said second absorption step with the gases supplied thereto, whereby to absorb benzene from said gases; and recycling a solution of benzene in said higher boiling alkyl benzenes to the separation step.

By employing benzene as a selective solvent for the olefinic reactants it is thus possible to concentrate the olefins and effect their separation from non-olefinic constituents, particularly hydrogen and methane. The latter constituents are less soluble in the benzene than the olefins under the conditions used for the absorption. This procedure also eliminates the use of high pressure gas compression equipment since the olefinic gases are charged to the alkylation step as a solution in benzene by means of liquid charge pumps or other suitable apparatus. The unabsorbed gases which contain appreciable quantities of benzene are preferably combined with the unconverted gases separated from the alkylation reaction products. The latter gases may contain, for example, hydrocarbons having 2, 3, and 4 carbon atoms per molecule and also some benzene. The combined gases are passed to a second absorption zone where the benzene is recovered by absorption in high boiling alkyl aromatics produced in the alkylation step of the process. After recovery in a common fractionation system the benzene is returned to the first absorption zone.

The operation of my process is more readily described by reference to the drawing which is a schematic flow diagram showing the inter-relation of the various steps of the process.

Referring to the drawing, benzene is introduced through line 3 into absorption zone 2. An olefin-containing gas mixture is introduced through line I. This mixture may conveniently comprise a cracked refinery gas containing, for example, hydrogen, methane, ethane, ethylene, propane, propylene, butanes, and butylenes. In absorption zone 2 the olefinic hydrocarbons are dissolved to a substantial extent in the benzene and this solution is supplied to a subsequent alkylation zone 5. Unabsorbed gases consisting essentially of hydrogen, methane, and smaller amounts of ethane, propane, and butane are withdrawn through line 6 and supplied to a second absorption step hereinafter described. Absorption zone 2 may comprise any of the well-known forms of absorption equipment wherein a gaseous and liquid phase are intimately contacted. For example, this zone may comprise a packed tower or a bubble plate type absorption column. The absorption step is ordinarily operated at a temperature of from about 10° C. to about 50° C. and at a pressure of from slightly superatmospheric pressure to about 500 pounds per square inch.

The benzene solution passes through a heating step not shown to an alkylation zone 5 wherein the alkylation of benzene with the dissolved olefins is effected by means of well-known catalysts such as phosphoric acid, sulfuric acid, zinc chloride, silica-alumina, hydrogen fluoride, etc., under suitable conditions of temperature, pressure, and reaction time. A preferred alkylation catalyst consists of a calcined composite of phosphoric acid and a siliceous carrier. Catalysts of this type are described in detail in United States Patents Nos. 1,993,512; 1,993,513; 2,067,764; 2,120,702; 2,157,208; and 2,275,183. With this catalyst the reaction temperature may be from about 200° C. to about 450° C. and preferably from about 225° C. to about 325° C. Pressures of from about 100 to about 2000 pounds per square inch may be employed and preferably from about 300 to about 1000 pounds per square inch. In order to obtain high yields of the mono alkyl benzenes it is essential that the reaction mixture contain a substantial molar excess of benzene over olefins for example, from about 2:1 to 25:1 or higher. With other alkylating catalysts, the operating conditions must be adjusted accordingly.

The alkylation reaction products are supplied through line 7 to separation zone 8 which may comprise one or a plurality of fractionation steps. A convenient method of operation consists in providing a preliminary gas separation zone wherein unconverted light gases are withdrawn through line 9 and returned either through lines 10, 27, and 1 to absorption zone 2 or they may be commingled in line 6 with unabsorbed gas from absorption zone 2 and subjected to further treatment hereinafter described. The liquid alkylation products are then subjected to fractionation. As an alternative method of operation the total reaction products are introduced into a fractionation zone and the unconverted light gases, particularly the olefinic constituents thereof, are recovered in the form of a solution in the unconverted benzene fraction withdrawn from separation zone 8 through line 14 and thus returned to line 3 and absorption zone 2. Ethylbenzene may be recovered through line 13 and isopropyl benzene or cumene is withdrawn through line 12. Although not shown, butyl benzenes may also be recovered as products if desired.

The higher boiling alkylation products such as polyethyl, polypropyl and polybutyl benzenes and higher boiling mono alkyl derivatives or mixtures thereof are removed through line 11 and supplied thereby to absorption zone 16. The light gases supplied from line 6 to absorption zone 16 will contain appreciable quantities of entrained or dissolved benzene. This benzene is recovered in absorption zone 16 by solution in the higher boiling alkyl benzenes. The solution thus formed is returned by means of line 18 and line 7 to separation zone 8. The benzene thus recovered is eventually returned through line 14 and line 3 to absorption zone 2 or, if desired, a portion thereof may be diverted through lines 15 and 4 to alkylation zone 5. Olefinic constituents, if present, and other unconverted light gases may also be absorbed in the higher boiling alkyl benzenes in addition to the benzene. The substantially benzene-free exit gases are vented from absorption zone 16 through line 17.

As an alternative method of operation it may be desirable to subject all or a portion of the higher boiling alkyl benzenes produced in the alkylation step to a dealkylation treatment. In this method of operation the higher boiling alkyl benzenes are supplied through line 19 to dealkylation zone 20. This reaction may be carried out in the presence of any known dealkylation catalyst, for example, a preferred catalyst comprises alumina such as the Activated Alumina of commerce and a hydrogen halide, preferably hydrogen chloride. Alumina-containing composites such as silica-alumina and certain natural alumina-containing earths, e. g., bauxite, may also be employed. With this particular catalyst, a temperature of from about 400° C. to about 700° C. and a pressure of from about atmospheric to about 100 pounds per square inch may be employed. Other known dealkylation catalysts such as aluminum chloride, zinc chloride, etc., may be employed under suitable operating conditions. The products of the dealkylation step are supplied from zone 20 through line 21 to separation zone 22. Under some conditions it may be desirable to introduce the dealkylation reaction products into separation zone 8 by means not shown. In the dealkylation step the higher boiling alkyl benzenes are converted to benzene or lower boiling alkyl benzenes and olefins. The benzene thus produced may be withdrawn through line 23 and recycled either through line 29 and line 3 to absorption zone 2 or through lines 29, 24, 15, and 4 to alkylation zone 5. Unconverted alkyl benzenes may be withdrawn through line 25 and if desired they may be recycled to the dealkylation step through line 26. The olefins produced in the dealkylation reaction are recycled through line 27 to line 1 and thence to absorption zone 2. In certain cases the dealkylation may not be carried to completion to produce benzene and olefins, but instead the end products may be lower boiling alkyl benzenes and olefins. The lower boiling alkyl benzenes may be recovered through line 23.

Under certain conditions it may be desirable to recover olefins through line 28 as a product of the process. A valuable substantially pure gaseous olefin fraction may be produced in such dealkylation operations. For example, the C₄ olefins produced by dealkylation of butyl benzenes with a catalyst such as silica-alumina should consist largely of isobutylene.

In an alternative method of operation it is possible to produce ethylbenzene and isopropyl benzene and/or butyl benzenes in separate selective steps. In such a procedure the benzene-olefin solution from absorption zone 2 is subjected to selective alkylation in a first alkylation zone at relatively mild conditions or with a relatively less active alkylation catalyst to produce isopropyl benzene and/or butyl benzenes without substantial formation of ethylbenzene. The unreacted ethylene contained in the effluent gases from said first alkylation zone is reacted with further quantities of benzene to produce ethylbenzene in a second alkylation zone maintained at higher temperatures and/or pressures or in the presence of a more active catalyst. For example, if a so-called solid phosphoric acid alkylating catalyst comprising a calcined composite of phosphoric acid and a siliceous carrier is employed in each alkylation zone, the temperature in the first alkylation stage may be from about 50° C. to about 200° C. while the temperature in the second alkylation stage may be from about 250° C. to about 350° C. In either zone the pressure may be from about atmospheric to about 1500 pounds per square inch. Somewhat higher temperatures may be employed in the first stage if operating at low pressures. Unreacted ethylene may be recycled to the second alkylation stage.

The following specific examples of the operation of my process are intended to illustrate the general characteristics of this method of operation and it is not intended to limit the essential features of the invention thereby.

*Example I*

A cracked refinery gas having the following molal composition was employed in these tests: nitrogen 4.0%, carbon monoxide 0.2%, hydrogen 5.4%, methane 37.8%, ethylene 10.3%, ethane 24.7%, propylene 6.4%, propane 10.7%, and C₄ hydrocarbons 0.5%. About 1766 liters of this gas was contacted with about 90 liters of benzene at a pressure of 200 pounds per square inch and a temperature of 25° C. An exit gas which consisted largely of hydrogen and paraffin hydrocarbons was removed continuously from the absorption zone. An analysis of this gas showed an ethylene content of only 3.2 mol % and a propylene content of only 0.6 mol %. The dissolved gas consisted of 16.4 mol % ethylene and 8.8 mol % propylene. The effluent undissolved gases contained about 2.0 mol % benzene.

Table I below summarizes the relative proportions of the two gas fractions and the ethylene and propylene content of each.

Table I

|  | Gas charged | Dissolved gas | Undissolved gas | Total dissolved + undissolved |
|---|---|---|---|---|
| Volume, liters (0° C., 760 mm.) | 1,766 | 1,081 | 685 | 1,766 |
| Vol. percent of total |  | 61.2 | 38.8 |  |
| $C_2H_4$: |  |  |  |  |
| Vol. percent of gas | 10.3 | 16.4 | 3.2 |  |
| Liters | 182 | 177 | 22 | 199 |
| Vol. percent of total $C_2H_4$ |  | 89 | 11 |  |
| $C_3H_6$: |  |  |  |  |
| Vol. percent of gas | 6.4 | 8.8 | 0.6 |  |
| Liters | 113 | 95 | 4 | 99 |
| Vol. percent of total $C_3H_6$ |  | 96 | 4 |  |

This summary shows that 89% of the total ethylene and 96% of the total propylene were dissolved in the benzene. Under more efficient absorption conditions even greater percentages of the olefinic hydrocarbons could be dissolved. In the resultant benzene solution the molar ratio of benzene to total dissolved gas was about 21 and the molar ratio of benzene to total olefins was about 83. An analysis of the benzene solution indicated that it contained approximately 12 liters of dissolved gas per liter of solution.

The benzene-olefin solution thus prepared was employed as a liquid charging stock in a 108-hour alkylation run using a solid phosphoric acid catalyst prepared by calcining a mixture of ortho phosphoric acid and kieselguhr. The alkylation was conducted at a temperature of 275° C., 900 pounds per square inch gage, and a liquid hourly space velocity of 1.5. Table II below summarizes the yields of the products obtained and the operating conditions during a typical 12-hour period of the run.

Table II

|  | Example No. | | |
|---|---|---|---|
|  | I | II | III |
| Temperature, °C | 275 | 275 | 204 |
| Pressure, pounds per square inch gage | 900 | 900 | 400 |
| Liquid hourly space velocity | 1.5 | 3.2 | 3.0 |
| Benzene solution charged, liters | 3.75 | 7.31 | 7.30 |
| Wt. per cent monoethylbenzene in product | 0.80 | 0.65 |  |
| Wt. per cent isopropylbenzene in product | 0.71 | 0.68 | 0.69 |
| Wt. per cent polyalkylbenzenes in product | 0.20 | 0.19 | 0.05 |
| Monoethylbenzene yield, wt. per cent of theoretical | 72 | 59 |  |
| Isopropylbenzene yield, wt. per cent of theoretical | 104 | 101 | 107 |
| Exit gas, liters | 21.3 | 38.2 | 33.3 |
| Analysis of exit gas, mol. per cent: |  |  |  |
| $N_2$ | 4.2 | 14.2 | 17.4 |
| $H_2$ | 1.1 | 0.0 | 1.5 |
| $CH_4$ | 30.9 | 27.1 | 38.4 |
| $C_2H_4$ | 4.4 | } 46.0 | 33.7 |
| $C_2H_6$ | 46.1 |  |  |
| $C_3H_6$ | 0.0 | 0.2 | 0.0 |
| $C_3H_8$ | 11.3 | 11.2 | 7.8 |
| $C_4$ | 1.0 | 1.3 | 1.2 |
| $C_5+$ | 1.0 |  |  |
| Per cent ethylene converted | 88 |  |  |
| Per cent propylene converted | 100 | 100 | 100 |

It will be seen that the conversion of ethylene to monoethylbenzene was 72% of the theoretical whereas the conversion of propylene to isopropyl benzene was complete as shown by the absence of propylene in the exit gas and also by the fact that the theoretical yield of isopropylbenzene was obtained. An ethylene weight balance based on the exit gas analysis shows that 88% of the ethylene was reacted. The 16% difference between this figure and the amount converted to monoethylbenzene is probably accounted for by the formation of polyalkylbenzenes. Approximately 0.2 weight per cent of the total alkylation products comprised higher boiling polyalkylbenzenes. This material is readily contacted with the undissolved gases from the absorption zone and also with unconverted gases from the alkylation step, if desired, whereby to recover dissolved or entrained benzene from said gases. The solution of benzene in higher boiling alkyl benzenes may then be fractionated in common with the alkylation reaction products.

*Example II*

The benzene-olefin solution prepared as in Example I was employed for alkylation under the same operating conditions except that the liquid hourly space velocity was increased to 3.2. As seen from Table II, 59% of the theoretical yield of monoethylbenzene was obtained as compared with a yield of 72% in Example I. The conversion of propylene was complete under the conditions of Example II.

*Example III*

The operation in this example was the same as in Examples I and II except that the alkylation conditions were as follows: 204° C., 400 pounds per square inch gage, and 3.0 liquid hourly space velocity. The data are presented in Table II. No detectable amount of monoethylbenzene was formed under these conditions, whereas the conversion of propylene to isopropyl benzene was substantially complete. Thus it will be seen that the selective alkylation operation described in connection with the drawing is a completely feasible method of operation.

I claim as my invention:

1. A process for the production of alkyl aromatics which comprises absorbing normally gaseous olefins in an aromatic hydrocarbon fraction in a first absorption step, separating a solution of olefins in said aromatic fraction from unabsorbed gases which contain a substantial quantity of said aromatic, supplying said aromatic-olefin solution to an alkylation step, introducing the reaction products into a separation zone, recovering lower boiling alkyl aromatics, recycling unconverted aromatics to said first absorption step, separating higher boiling alkyl aromatics, contacting said higher boiling alkyl aromatics in a second absorption step with unabsorbed gases from said first absorption step, and recycling a solution of said aromatic reactant in said higher boiling alkyl aromatics to said separation step.

2. A process for the production of alkyl benzenes which comprises absorbing normally gaseous olefins in benzene in a first absorption step, subjecting the resultant benzene-olefin solution to alkylating conditions in an alkylation step, supplying the reaction products from the alkylation step to a separation step, recovering lower boiling alkyl benzenes, recycling unconverted benzene to said first absorption step, contacting higher boiling alkyl benzenes in a second absorption step with unabsorbed gases from said first absorption step whereby to recover benzene contained in said unabsorbed gases, and recycling a solution of benzene in higher boiling alkyl benzenes to said separation step.

3. A process for the production of alkyl benzenes which comprises contacting benzene in a first absorption step with olefin-containing gases to absorb olefins therefrom; supplying effluent unabsorbed gases containing benzene to a second absorption step; supplying benzene containing dissolved olefins to an alkylation step wherein alkylation of benzene with olefins is effected; separating the alkylation reaction products into unreacted light gases, unconverted benzene, lower boiling alkyl benzenes and higher boiling alkyl benzenes; recovering said lower boiling alkyl benzenes; recycling unconverted benzene to said first absorption step; contacting said higher boiling alkyl benzenes in said second absorption step with the gases supplied thereto from said first absorption step whereby to recover benzene from said gases; and recycling a solution of benzene in said higher boiling alkyl benzenes to the separation step.

4. The process of claim 3 wherein said unreacted light gases are supplied to said second absorption step along with effluent gases from said first absorption step.

5. The process of claim 3 wherein said normally gaseous olefins comprise ethylene and propylene.

6. The process of claim 3 wherein said normally gaseous olefins comprise ethylene, propylene and butylene.

7. The process of claim 3 wherein at least a portion of said higher boiling alkyl benzenes is subjected to dealkylation and the normally gaseous olefins thus produced are recycled to said first absorption step.

8. The process of claim 3 wherein at least a portion of said higher boiling alkyl benzenes is subjected to dealkylation and at least a portion of the olefins produced in said dealkylation step is recovered as a product of the process.

9. The process of claim 3 wherein said alkylation step comprises two selective alkylation zones in the first of which benzene is alkylated with normally gaseous olefins having a higher molecular weight than ethylene and in the second of which benzene is alkylated with the unconverted ethylene from said first alkylation zone.

10. The process of claim 3 wherein said alkylation reaction is conducted in the presence of a solid phosphoric acid catalyst.

11. A process for producing alkyl benzenes which comprises scrubbing an olefin-containing gas with liquid benzene, thereby forming a solution of olefin in liquid benzene and an unabsorbed gas containing benzene, subjecting said solution to alkylation to react absorbed olefin with at least a portion of the benzene, separating from the resultant products a lower boiling alkylated benzene fraction and a higher boiling alkylated benzene fraction, scrubbing said unabsorbed gas containing benzene with at least a portion of said higher boiling fraction to separate benzene from the last-named gas, and supplying the thus separated benzene to the alkylation step.

WILLIAM J. MATTOX.